(12) United States Patent
Morales

(10) Patent No.: US 6,374,090 B1
(45) Date of Patent: Apr. 16, 2002

(54) CELLULAR TELEPHONE HANDSET HOLDER

(76) Inventor: William E. Morales, 1 Milburn Rd., South Setauket, NY (US) 11720

( * ) Notice: Subject to any disclaimer, the term of this patent is extended or adjusted under 35 U.S.C. 154(b) by 0 days.

(21) Appl. No.: 09/440,957

(22) Filed: Nov. 16, 1999

(51) Int. Cl.[7] .................................................. H04B 1/38
(52) U.S. Cl. ........................ 455/90; 455/575; 455/100; 455/568; 379/430
(58) Field of Search ........................... 455/90, 100, 575, 455/351, 568; 379/430, 449; 381/187

(56) References Cited

U.S. PATENT DOCUMENTS

| 4,048,453 A | | 9/1977 | Seidel |
| 4,881,256 A | | 11/1989 | Malekos |
| 5,086,464 A | * | 2/1992 | Groppe ........................ 379/430 |
| 5,233,650 A | | 8/1993 | Chan |
| 5,407,113 A | | 4/1995 | Golliher |
| 5,689,558 A | | 11/1997 | Osgood et al. |
| 5,697,071 A | * | 12/1997 | Fan .............................. 455/90 |
| 5,703,946 A | | 12/1997 | Chen |
| 5,706,345 A | | 1/1998 | Allen |
| 5,787,166 A | * | 7/1998 | Ullman ........................ 379/430 |
| 5,826,201 A | * | 10/1998 | Gratias ........................ 455/575 |
| 5,828,749 A | | 10/1998 | Brodskiy |

* cited by examiner

*Primary Examiner*—Daniel Hunter
*Assistant Examiner*—Lana Le

(57) ABSTRACT

An apparatus is provided that is a portable telephone handset holder having a clamp griping a portable telephone, wherein the clamp grips the sides of the portable telephone and a clipping means clipping the portable telephone onto an ear of a user and is attached to the clamp. When the handset holder is placed onto the user's ear, the receiver of the portable telephone is in direct proximity of the user's ear.

18 Claims, 4 Drawing Sheets

CELLULAR TELEPHONE HANDSET HOLDER

BACKGROUND OF THE INVENTION

1. Field of the Invention

This invention relates generally to a cellular telephone handset holder and more particularly to a holding device that securely holds a cellular telephone in close proximity to and attaches to a user's ear.

2. Description of the Related Art

Telephone handsets are devices commonly used to listen to telephone voice transmissions and to speak into the telephone. The term "handset" as used here refers to any communication instrument with a speaker and microphone that users normally hold with their hands. Handsets are used with conventional corded telephones, cordless telephones and modular cellular telephones. They are used extensively in compact cellular telephones that are self-contained within a handset. It has been conventional practice to hold the telephone and/or phone receiver to the mouth and ear of the user with the use of the hand.

All of the above described telephones and similar communication instruments are used extensively in home and work environments by large portions of the population. People frequently use handsets, and particularly cordless and cellular telephones, to carry on conversations with other people while engaged in other activities. These activities include reading, working at a computer, cooking, cleaning, walking, driving a motor vehicle, etc. Difficulties are encountered if the phone user is handicapped in the hands and/or arms and cannot hold the phone properly, or if the user needs his or her hands free to do the other work. Many of these activities can simply be performed easier, more efficiently and safer with two hands than with one hand. An apparatus that would allow hands free use of handsets would make it easier, more efficient and safer to perform other activities while speaking on a telephone.

A number of telephone holders have been suggested and developed to retain both corded and cordless telephones. By way of example, U.S. Pat. No. 5,407,113 by Clayton R. Golliher or U.S. Pat. No. 5,706,345 by James E. Allen. These, and like devices, typically have a strap or flexible band that goes over or around the head. This can become cumbersome for the user.

A need therefore exists for a telephone holding device that can be comfortable for the user without having to be placed over the user's head and overcome the shortcomings of the known devices.

SUMMARY OF THE INVENTION

In accordance with the principles of the invention, a cellular telephone holding device is achieved by having a holder that clips onto the phone and subsequently clips onto the ear enabling the ear itself to support the telephone.

According to one aspect of the present invention, a cellular telephone handset holder is achieved by having vertical spring clips that hold the telephone at the proper angle in conjunction with an earpiece that fits snugly over the ear. This then will have the effect of holding the telephone firmly to the user's ear during use.

DESCRIPTION OF THE DRAWINGS

So that one skilled in the art to which the subject invention appertains will better understand how to practice the present invention, preferred embodiments of the apparatus and method will be described in detail hereinbelow with reference to the drawings wherein.

DETAILED DESCRIPTION OF PREFERRED EMBODIMENTS

Figure 1:
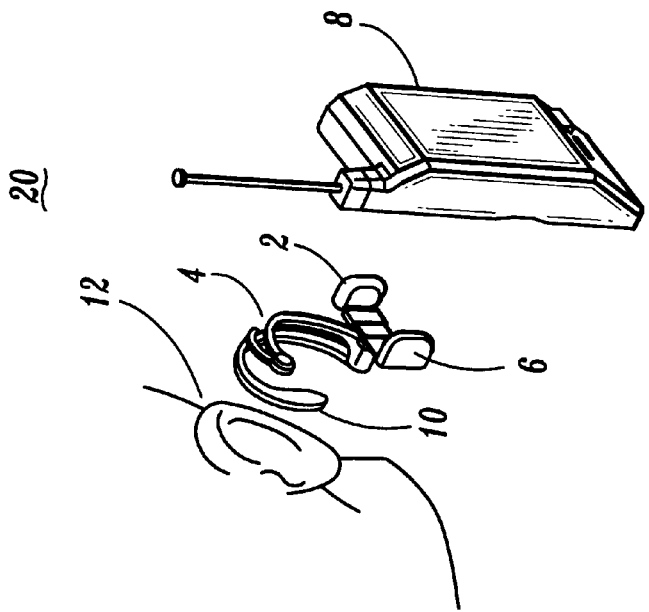
FIG. 1 is an isometric view of a cellular telephone handset holder in accordance with the principles of the present invention.

FIG. 1 shows a first embodiment as an isometric view of a cellular telephone handset holder 20 in accordance with the principles of the present invention. The handset holder 20 is made out of, for example, high-density polyethylene plastic, metal encased in plastic, such as steel or aluminum, hardened rubber or any other light-weight, non-electrically conductive material. The handset holder 20 has a right telephone grip 2 and a left telephone grip 6 that can vary in width. The handset holder 20 clips onto the user's ear by way of clip 4, 10.

The right telephone grip 2 and left telephone grip 6 expand and contrast allowing the user to snugly and securely fit any size cellular telephone 8 onto the holder 20. The user expands the telephone grips 2, 6 so that the space between them is greater than the width of the portable telephone 8. The telephone grips 2, 6 are placed anywhere along the sides of the cellular telephone 8 such that the earphone portion (not shown) of the cellular telephone 8 is not blocked by the cross bar 12 of the grips 2, 6. The user then contracts the right grip 2 and left grip 6, in equal amounts, temporarily securing the telephone 8 for handsfree use. This contraction may be either by gently forcing the right grip 2 and left grip 6 towards each other or by having the grips 2, 6 spring loaded and snap back towards the portable telephone 8.

The handset holder 20, with the cellular telephone 8 attached is subsequently clipped onto the user's ear by sliding the inner clip portion 10 behind the user's ear and the outer clip portion 4 in front of the user's ear.

Figure 2:
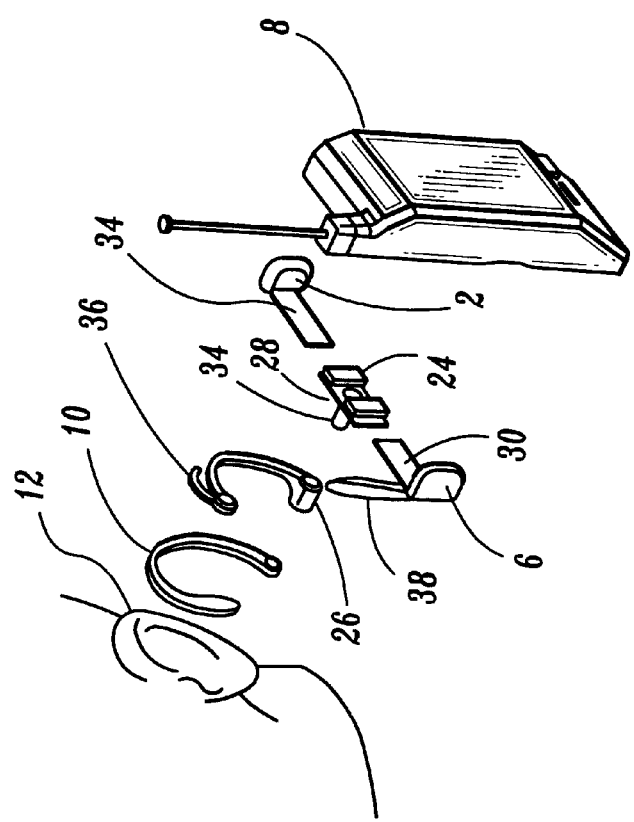
FIG. 2 is an exploded view of a cellular telephone handset holder as shown in FIG. 1.

FIG. 2 shows an exploded view of the handset holder 20. The right telephone grip 2 has a right tab 32 that slides within right slot 24. The left telephone grip 6 has a left tab 30 that slides within left slot 22. Both the right slot 24 and the left slot 22 apply pressure to right tab 32 and left tab 30, respectively. This pressure will hold the grips 2, 6 in position once the telephone grips are expanded or contracted. The cellular telephone 8 is therefore held securely in place will not slip out. Small tension springs may be attached between the slots 22, 24 and their respective grips 2, 6. The springs will cause the grips 2, 6 to always want to contract towards the portable telephone 8, holding the telephone 8 securely. The grips 2, 6 can be designed with cut-outs or in various shapes in order to accommodate the various particular needs of the different manufacturer's specific models. This will allow for any buttons, switches or the like to be readily accessible to the user. For heavier portable telephones, a small strip of hook and loop material may be added to the grips and to the sides of the portable telephone to further secure the telephone to the handset holder.

As an additional feature, the handset holder can have an antenna shield 38 incorporated into the grip 6. This shield 38 is in a half round shape and aids in protecting the user from any microwave radiation that may be emitting from the cellular telephone.

The ear clip 4 has an inner portion 10 and an outer portion 4. The outer portion 4 further has a circular slot 26. A cylindrical tab 34 slides into the circular slot 26 connecting the ear clip 4 with the telephone grips 2, 6. The cylindrical shape of the slot 26 and tab 34 allows the cellular telephone 8 to rotate for maximum comfort to the user. The inner portion 10 fits behind the user's ear 32. The outer portion 4 is attached to inner portion 10 also by the use of circular slot 26. The upper portion 36 of outer portion 4 applies pressure to the outside of the user's ear 32, holding the portable or cellular telephone 8 in place against the user's ear 32. The cellular telephone 8 therefore rests comfortably against the user's ear 32 without the need to for the user to hold the telephone 8. The upper portion 36 may be slightly angled with a small piece of padding. This padding acts as a tunnel for the sound waves to travel to the user's ear. As a secondary benefit, the padding moves the portable telephone away from the user's head, minimizing any microwave radiation admitting from the telephone or its antenna.

Figure 3:
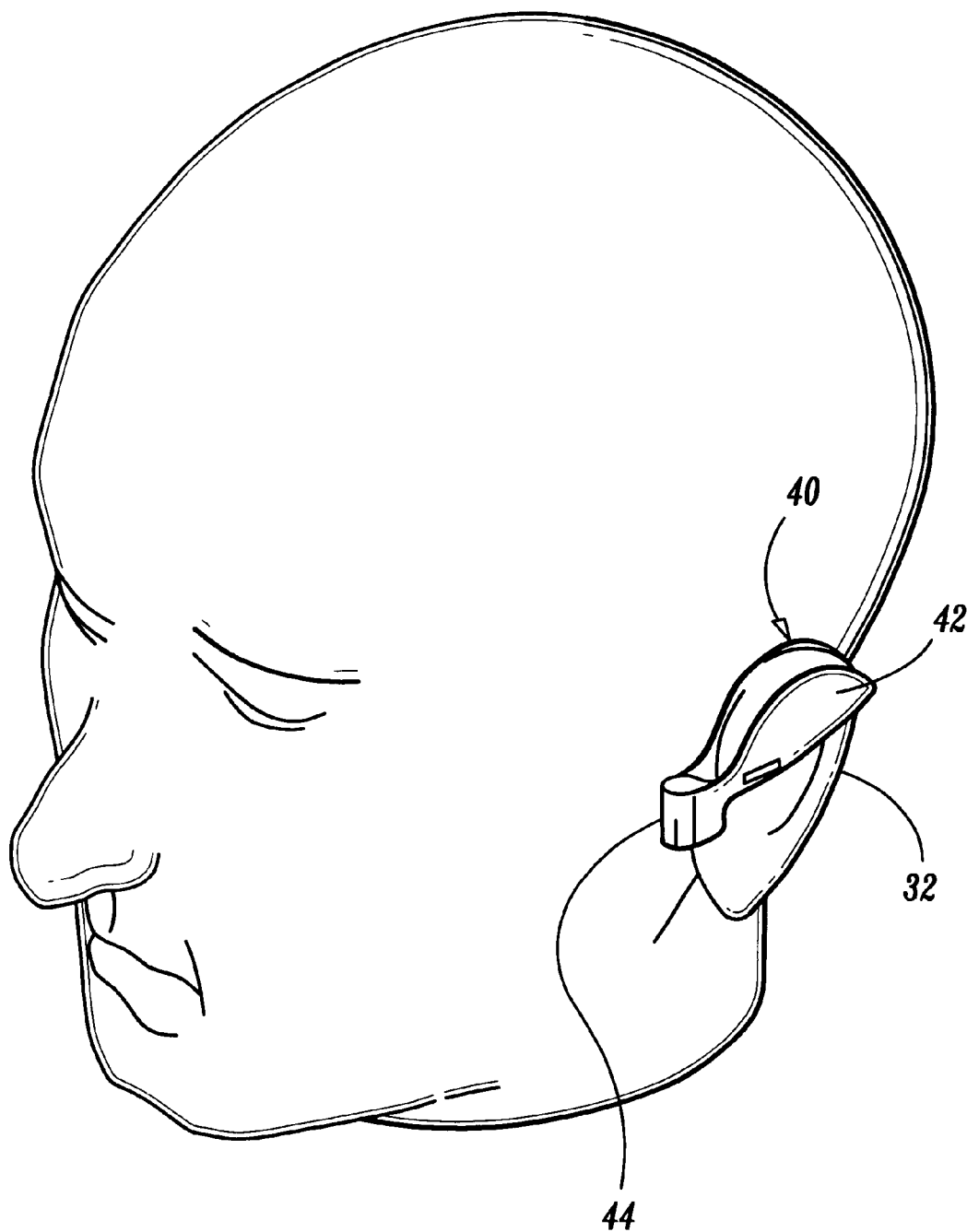
FIG. 3 is an isometric view of the ear clip portion of a cellular telephone handset holder in accordance with the principles of the present invention.

A variation to the ear clip portion 4 is shown in FIG. 3. The inner portion 40 and the outer portion 42 can be one piece. The inner portion 40 and outer portion 44 are pinched together forming pressure on the user's ear 12, securing the handset holder 20 to the user. Alternatively, the inner portion 40 and outer portion 42 can be two separate parts, having a torsion spring 44 housed within the connection. The torsion spring 44 maintains sufficient pressure between the inner portion 40 and the outer portion 42 to keep the handset holder 20 from slipping off of the user's ear 12. The compressive force of the spring is against the user's ear 12 and towards the user's head.

Figure 4:
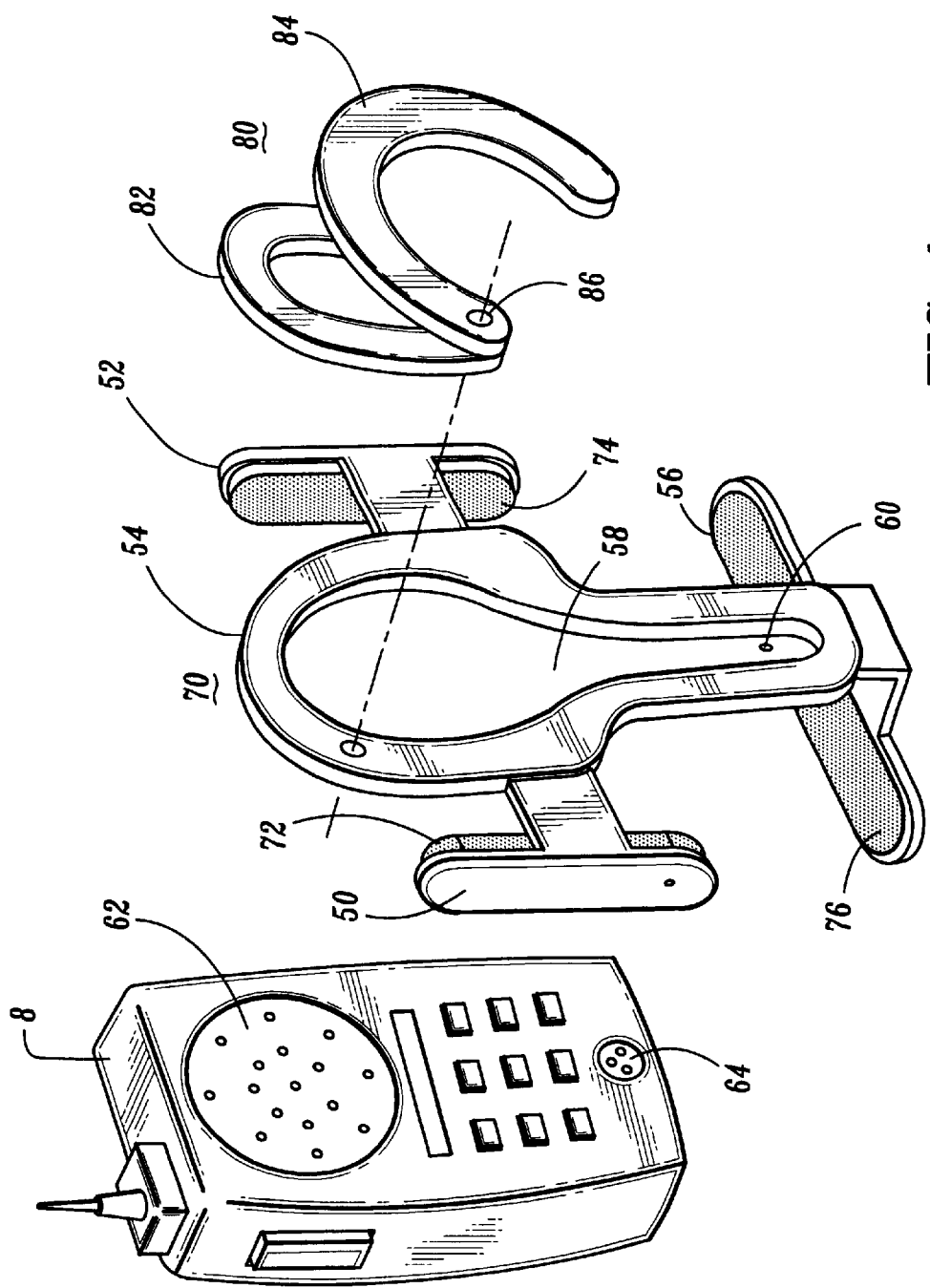
FIG. 4 is an isometric view of a cellular telephone handset holder with a base in accordance with the principles of the present invention.

As an alternative embodiment, FIG. 4 shows an isometric view of a cellular telephone handset holder with a base 56. The ear tension mechanism 80 is similar to that in FIG. 3 where there is an inner portion 84 and outer portion 82. The two portions are connected maintaining pressure on the user's ear. The connector 86 also connects the ear tension mechanism 80 to the top 54 of the telephone holder 70. The telephone holder 70 is in a keyhole shape. The upper opening 58 allows the user's ear to rest directly on the telephone's speaker 62. This maximizes the clarity of the cellular telephone by having no distractions or gaps between the speaker 62 and the user's ear (not shown). The lower opening 60 of the key allows the user to speak directly into the cellular telephone's mouthpiece 64.

On either side of the telephone holder 70 are adjustable grips 50, 52. These slide in and out in a similar manner as described above in order to grip portable or cellular telephones of various widths. Each of the grips 50, 52 have pads 72, 74. These pads are typically made out of a soft material such as felt, foam, cloth, rubber or bubbled plastic. This is to further prevent the cellular telephone 8 from sliding out of the holder or becoming scratched.

On the bottom the the telephone holder 70 is a base 56. The base 56 extends horizontally outward and allows the telephone holder to be used with heavier cordless or cellular telephones 8. The cellular telephone 8 rests on the base 56 and leans in toward the user. The base 56 is padded 76 in much the same manner as the side grips 50, 52. The base 56 can also be vertically adjustable. This allows the user to align the speaker 62 and mouthpiece 64 with the keyhole slots 58, 60.

Figure 5B:
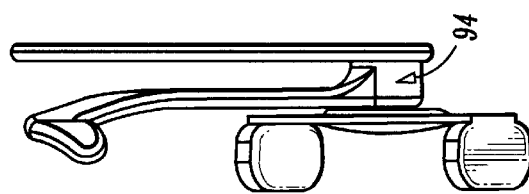
FIG. 5b is a side view of an angled ear clip portion of a cellular telephone handset holder in accordance with the principles of the present invention.
Figure 5C:
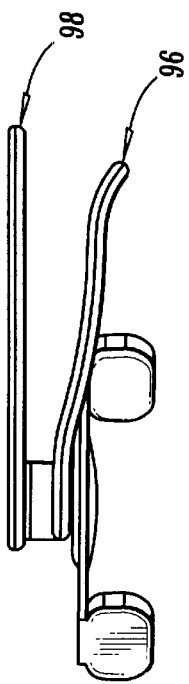
FIG. 5c is a top view of an angled ear clip portion of a cellular telephone handset holder in accordance with the principles of the present invention.
Figure 5A:
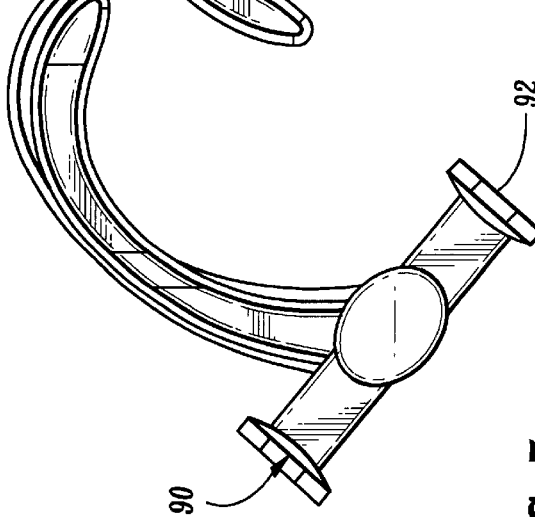
FIG. 5a is a front view of an angled ear clip portion of a cellular telephone handset holder in accordance with the principles of the present invention.

FIG. 5a shows a front view of an angled ear clip portion of a cellular telephone handset holder. The telephone grips 90, 92 are rotated approximately 40 degrees from horizontal. This points the antenna of the telephone away from the user's head. Angling of the telephone reduces the effects of the microwave radiation being produced from the antenna. The radiation emitting from the antenna is dispersed into the atmosphere, instead of into the head of the user. This angling further maximizes reception of the cellular telephone by moving the antenna away from the user's head, eliminating potential blockage. As an added benefit, the angling of the portable telephone moves the mouthpiece of the telephone closer to the user's mouth.

FIG. 5b a side view of an angled ear clip portion of a cellular telephone handset holder. In order to adjust the angle against the user's head, the torsion connection 94 is formed using two peices. The two peices are keep together via the spring torsion as described above in FIG. 3. In the present embodiment, the connection includes a mini-gears acting like teeth and causes a clicking action between the two pieces. This action allows for the grips 90, 92 to rotate to multiple positions for the user to position the cellular telephone in various angles.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A portable telephone handset holder, comprising:
   a clamp griping a portable telephone,
      wherein said clamp grips the sides of said portable telephone; and
   a clipping means clipping said portable telephone onto an ear of a user
      wherein said clipping means further comprises an inner portion and an outer portion pushing towards each other causing tension on said user's ear and is affixed to said clamp, placing a receiver of said portable telephone in direct proximity of said ear.

2. The telephone handset holder of claim 1, wherein said clamp further comprises a first side and a second side in order to expand and contrast, allowing said user to place said portable telephone within said clamp.

3. The telephone handset holder of claim 2, wherein said first side of said clamp and said second side of said clamp are spring loaded maintaining constant pressure on said portable telephone.

4. The telephone handset holder of claim 2, wherein said clamp further comprises a keyhole support between said first side and said second side further allowing sound to pass between said user and said portable telephone.

5. The telephone handset holder of claim 2, further comprising an antenna shield fixedly attached perpendicular to said clamp.

6. The telephone handset holder of claim 3, wherein said first side of said clamp and said second side of said clamp are padded.

7. The telephone handset holder of claim 2, wherein said first side of said clamp and said second side of said clamp are padded.

8. The telephone handset holder of claim 1, wherein said clipping means further comprises a torsion spring between said inner portion and said outer portion maintaining pressure against said user's ear.

9. The telephone handset holder of claim 1, wherein said outer portion of said clipping means further comprises padding moving said portable telephone away from said user's ear.

10. The telephone handset holder of claim 1, wherein said clipping means rotates relative to said clamp.

11. The telephone handset holder of claim 1, wherein said holder is fabricated out of a non-electrically conducting material.

12. The telephone handset holder of claim 1, wherein said clamp further comprises a base supporting said portable telephone.

13. The telephone handset holder of claim 12, wherein said base of said clamp is padded.

14. A portable telephone handset holder, comprising:

a clamp griping a portable telephone, wherein said clamp grips the sides of said portable telephone having a first side and a second side in order to expand and contrast, allowing said user to place said portable telephone within said clamp; and a clipping means clipping said portable telephone onto an ear of a user wherein said clipping means is affixed to said clamp, placing a receiver of said portable telephone in direct proximity of said ear having an inner portion and an outer portion pushing towards each other causing tension on said user's ear.

15. The telephone handset holder of claim 14, wherein said first side of said clamp and said second side of said clamp are padded.

16. The telephone handset holder of claim 14, wherein said clamp further comprises a base supporting said portable telephone.

17. The telephone handset holder of claim 14, further comprising an antenna shield fixedly attached perpendicular to said clamp.

18. The telephone handset holder of claim 14, wherein said clipping means rotates relative to said clamp.

* * * * *